Patented Dec. 10, 1940

2,224,238

UNITED STATES PATENT OFFICE 2,224,238

COMPOSITION AND METHOD OF MAKING SAME

Donald H. Spitzli, Arlington, and Reeves L. Kennedy, Plainfield, N. J., assignors to Congoleum-Nairn Inc., a corporation of New York No Drawing. Application November 11, 1936, Serial No. 110,304

4 Claims. (Cl. 106—7)

This invention relates to composition and method of making same. It relates especially to compositions comprising a binder material interspersed with a filler material.

Features of this invention relate primarily to the character and properties of the filler material that is interspersed in a binder such as linoleum cement, a soluble cellulose derivative, chlorinated rubber, synthetic resin or the like.

It is a purpose of this invention to afford compositions comprising a binder, e. g., a binder of the character aforesaid and a filler material, which compositions have novel properties and embody improvements in various respects upon compositions heretofore made and sold.

In order to afford an understanding of this invention and the purposes, features and advantages thereof, it will be described for the purpose of illustration in connection with linoleum composition and the manufacture thereof.

Linoleum composition, as heretofore generally manufactured, comprises a so-called linoleum "cement" consisting substantially of oxidized oil and resinous material, interspersed with an organic filler such as wood flour or ground cork and a mineral filler such as whiting, lithopone, ochre, etc. The mineral filler usually includes pigments selected in suitable amount and color to give a desired shade to the finished product. A typical example of a linoleum composition is as follows:

|  | Per cent |
|---|---|
| Linoleum cement | 30 to 40 |
| Wood flour | 30 to 35 |
| Mineral filler and pigments | 40 to 25 |

The linoleum cement usually comprises about 65% to 85% of oxidized oil and 15% to 35% of resinous material. The oil which is generally employed in making linoleum cement is linseed oil.

The preparation of linoleum cement is very well known and detailed reference thereto is not regarded as necessary herein. It may be mentioned, however, that there are two methods commonly used for making linoleum cement. According to one method a boiled linseed oil is trickled over cloth in oxidizing houses while exposed to air at about 100° to 140° F. until a body of coagulated oil is built up which is of desired thickness. This coagulated oil is subsequently fluxed with resinous material such as rosin, Kauri gum, or the like to form the cement. According to the second process an oil-resin mixture is oxidized at elevated temperatures, e. g., from about 140° to about 270° F. in a drum provided with an agitator, air being blown into the mixture and agitation being continued until an elastic semi-solid material is obtained.

In making linoleum composition, a linoleum cement, such as a cement of the character aforesaid, is mixed with filler materials and the resulting linoleum composition can be molded in any suitable way and, if desired, deposited on a suitable backing to produce covering materials suitable for floors, walls and the like. The linoleum composition, after preparation and molding, is then seasoned to toughen and harden it. The seasoning usually is caused to take place at elevated temperature, e. g., from about 160° to 180° F. and usually requires several weeks.

For use in coverings for floors, walls and the like, linoleum composition should have such properties as flexibility, resiliency, resistance to abrasion, and resistance to soiling. Resistance to soiling is especially important in connection with floor coverings. Resistance to soiling can be improved by increasing the proportion of mineral filler in linoleum composition. However, the amount of mineral filler which can be used in commercially satisfactory linoleum of the type heretofore manufactured, is limited, inasmuch as increase in the amount of mineral filler ordinarily results in decrease in the flexibility, resiliency, working properties and resistance to abrasion of the linoleum composition.

By the employment of this invention in connection with linoleum composition, the soil resistance of linoleum composition can be greatly increased while still retaining (and in preferred practice, while actually improving upon) the flexibility, resiliency, working properties and abrasive resistance of the linoleum composition.

It is a feature of this invention that the filler material which is interspersed in the binder, comprises a solid nuclear portion and a coating portion comprising linoxyn having certain characteristics, the nature of which is described more in detail below. By linoxyn, reference is made to the product of oxidation and coagulation of a drying or a semi-drying oil, after the oil has been transformed from a liquid to a solid state. While linoxyn denotes a drying oil which has been transformed to a solid state, linoxyn not only contains coagulated constituents of the original oil, but also certain uncoagulated constituents of the original oil. The solid nuclear portion of the filler particles preferably consists of usual vegetable filler material such as wood flour or ground cork or a mineral filler material such as those above mentioned or a mixture of vegetable and mineral filler materials.

In the making of ordinary linoleum composition, filler material such as vegetable filler material and mineral filler material is mixed with a linoleum cement consisting substantially of oxidized oil and resinous material. According to the present invention, instead of adding the filler material directly to the linoleum cement, part or all of the filler material is first coated with a coating comprising an oxidized and coagulated oil differing substantially from the oxidized oil component of the linoleum cement. Thereafter the particles comprising the coating are mixed with the linoleum cement, the coated particles being interspersed with the linoleum cement in discrete form as a filler. From one aspect, it is a feature of this invention that the coagulated and oxidized oil or linoxyn which is carried as the coating part of the filler particles, has the property of being at least about 80% insoluble in ethyl ether. Insolubility is determined by extraction for twenty-four hours with ethyl ether in a Soxhlet extraction apparatus. Preferably, the linoxyn comprised in the coating part of the filler particles is at least about 85% insoluble in ethyl ether.

Particles of filler material comprising a coating containing highly coagulated linoxyn of the character above mentioned is of great advantage when interspersed in a binder. This may be illustrated in connection with linoleum composition. For example, by the use in a linoleum composition of only about 6% to 15% of highly coagulated linoxyn as a coating for finely divided solid material, a filler material is afforded which when incorporated with linoleum cement of the type suitable for flooring, for example, affords a linoleum composition having much improved soil resistance and at the same time a very high degree of pliability, resilience, and resistance to abrasion.

The increase in soil resistance that is afforded by using filler particles comprising a coating containing highly coagulated linoxyn appears to be the result of several factors. In the first place, it has been found that the highly coagulated linoxyn has a much higher resistance to soiling than the particles coated therewith. This is especially true in the case of vegetable filler materials such as wood flour and ground cork, as such vegetable filler materials are porous, absorptive and stain quite easily. When the porous surface of a vegetable filler material is filled and coated with highly coagulated linoxyn, the resulting filler particles have much greater resistance to soiling than the uncoated vegetable filler.

When solid finely-divided filler materials are coated with highly coagulated linoxyn, the coated particles are rendered less absorptive of linoleum cement, thereby permitting the use of a decreased quantity of linoleum cement and a corresponding decreased amount of those ingredients of linoleum cement which are particularly susceptible of soiling such as resinous material and unhardened oil constituents. Moreover, the addition of filler particles comprising a linoxyn coating has the unexpected result of decreasing the harmful effects of those resinous materials and unhardened oil ingredients which remain in the linoleum cement that is used.

When linoleum composition is prepared using filler particles including a coating comprising linoxyn of the character aforesaid, one can incorporate a substantially greater quantity of mineral filler than has been regarded as practical heretofore without sacrificing the working properties and flexibility and resiliency of the linoleum composition. The use of increased quantities of mineral filler which is possible because of the presence of the filler particles comprising a linoxyn coating contributes to the increased soil resistance that can be obtained when such filler particles are employed in linoleum composition in the practice of this invention.

The filler particles comprising a linoxyn coating of the character described normally are non-sticky and dry-appearing and cannot be calendared into a coherent sheet When, however, such particles are employed in linoleum composition, the resulting product has high flexibility and resilience as compared with linoleum composition using (in lieu of the particles comprising the linoxyn coating) ordinary filler material such as mineral and vegetable filler materials. Even when the mineral filler content is increased so as to be greater than in ordinary present-day linoleums (thus tending to make the linoleum more rigid and brittle), the incorporation of filler particles comprising a linoxyn coating permits the production of a linoleum composition which is considerably more resilient and flexible than those which are manufactured at the present time. The imparting of increased flexibility and resiliency makes the linoleum composition better suited for use in floor coverings, for example, as the linoleum composition is rendered much more resistant to cracking, shipping, abrasion and the like. Moreover, since the use of filler particles comprising a linoxyn coating tends to impart decreased thermoplasticity to a linoleum composition, a linoleum composition including such filler particles has good working properties even when an abnormally large amount of mineral filler is present.

It is also significant that the employment of filler particles including a coating comprising linoxyn of the character aforesaid is of value in preventing gradual hardening and embrittlement of linoleum composition after it has been made.

It is of still further advantage that the employment of filler particles comprising a linoxyn coating of the character aforesaid enables linoleum composition to be produced which has decreased water absorption and decreased expansion due to moisture absorption. One of the objectionable features of linoleum composition is the tendency of such compositions to swell under damp or humid conditions and to shrink when dried out again. This swelling and shrinking is harmful in linoleum installations of substantial size.

In order to enable one to readily practice this invention, a preferred method will be described wherein filler particles comprising a linoxyn coating having desired characteristics may be prepared. China-wood oil (hereinafter referred to as "wood" oil) with or without drier such as lead or cobalt is heated at a temperature of about 350° to 450° F. with agitation but with no attempt at aeration until it gels to a light jelly-like consistency. It is then cooled rapidly to room temperature to prevent further reaction. The product at this point may vary considerably in consistency and character, but it is preferred to work with a gelled oil which has insolubility in ethyl ether of from about 40% to about 50%. The gelled oil is then transferred to a suitable apparatus provided with means for agitating the material and maintaining it at desired temperature and the particles which are to form the nuclear portion of the filler particles are also placed in the apparatus. These particles preferably include all of the vegetable filler material that is to be used in the linoleum composition and at least part of the mineral filler material. These particles may correspond in size and character to the filler materials that are commonly used in the manufacture of linoleum composition. The gelled oil and finely-divided filler material is then kneaded and worked in the apparatus while maintained at a temperature of about 220° F. to about 280° F. The kneading is carried out in the presence of air in order to hasten the reaction. During this operation, the oil oxidizes and polymerizes until the particles (comprising a solid nuclear portion and a coating portion) become of whitish appearance and until the mass as a whole is in a relatively dry or powdered condition. At this point, the heat is discontinued and the mass is cooled with agitation to prevent agglomeration of the particles. The resulting linoxyn coating comprised in the filler particles has an insolubility in ethyl ether of about 90% or more. In order to insure uniformity of particle size, the mass may be ground by passing it between grinding rolls set closely together.

In the preparation of the linoxyn coating for the filler particles, it is preferable to employ an oil or oil mixture which is capable of attaining a high degree of coagulation as evidenced by its insolubility in ethyl ether. Wood oil has this property. Oiticica oil also has this property. Thus when oiticica oil is treated as above described, the resulting linoxyn in the coating for the filler particles is usually about 88% insoluble in ethyl ether. When wood oil (or oiticica oil) is blended with other oils and treated as above described, the composite linoxyn has a greater proportion of ethyl ether-insoluble material than if the two oils were treated separately and the resulting linoxyns thereafter mixed. In the preparation of linoxyn to be used as a coating for filler particles according to this invention, it is preferable to employ an oil such as wood oil or oiticica oil, either alone or mixed with some drying or semi-drying oil such as linseed oil, perilla oil, soya bean oil, fish oil or cottonseed oil. For example, by the use of two parts of wood oil and one part of linseed oil, a linoxyn in the coating part of the filler particles can be obtained which is about 90% insoluble in ethyl ether. A mixture of three parts of wood oil and one part of fish oil or perilla oil gives a linoxyn which is about 85% insoluble in ethyl ether. When an oil such as linseed oil is used alone as a coating for the filler particles, the maximum insolubility of the oxidized and coagulated oil in ethyl ether that can be obtained without loss of resilience and discoloration of the oil is about 80%. This degree of insolubility in ethyl ether can be attained more readily, however, by mixing wood oil or oiticica oil with the linseed oil during the oxidation and coagulation of the oil. When the insolubility of the oil in ethyl ether drops below about 80%, it has been found that the suitability of the linoxyn as a coating for filler particles is greatly lessened. For preferred results, the coating for the filler particles should comprise linoxyn having an insolubility in ethyl ether of about 85% or more.

In the preparation of filler particles comprising a coating containing linoxyn produced by coagulation and oxidation of an oil, it is not essential that the procedure described above by way of example be followed. Thus it is not essential to preliminarily subject the oil to heating without aeration as the oil can, in the preliminary stages of treatment, be subjected to combined heating and aeration. In fact, when a substantial proportion of some oil such as linseed oil is used, aeration substantially promotes the preliminary gellation of the oil. If, however, the oil is initially subjected to aeration as by blowing, the blowing should take place at a temperature somewhat lower, e. g., at about 200° to about 260° F., than when the oil is gelled by heat alone. If desired, the entire operation of coagulating and oxidizing the oil can be carried out in the apparatus in which the ultimate linoxyn coated particles are formed, but such procedure would require a longer time within which to obtain the desired product.

When a linoxyn which has been produced by coagulation and oxidation of an oil until it is 80% (preferably 85%) insoluble in ethyl ether is comprised in a coating for filler particles, and when the filler particles comprising the coating are interspersed in binder materials such as those above mentioned, the particles remain in discrete form and distinct from the binder. By mixing filler particles comprising a coating containing linoxyn with such binders, with or without the addition of other fillers, a variety of useful compositions is afforded.

In the manufacture of linoleum composition, the filler particles comprising linoxyn as a coating may be mixed with the linoleum cement instead of or in addition to the usual linoleum fillers and in the same manner that ordinary linoleum fillers are interspersed in linoleum cement. The resulting linoleum composition can then be molded and seasoned as in the manufacture of floorings and other covering materials. While the linoleum cement contains oxidized oil, the proportion of uncoagulated oil constituents (as evidenced by the ethyl ether solubility test) in the oxidized oil component of the cement is substantially greater than the proportion of uncoagulated oil constituents in the linoxyn in the coating for the filler particles. In this connection, ordinary oxidized oil produced by the methods heretofore used for making linoleum cement rarely exceeds sixty per cent. insolubility in ethyl ether. Moreover, as the linoxyn coating for the filler particles is prepared from oil substantially free of resinous materials, the coating for the resulting filler particles is likewise substantially free of resinous material. The freedom of the coating for the filler particles from resinous material is one of the factors which, as aforesaid, contributes to the soil resistance of the linoleum composition. While it is not beyond the scope of this invention to combine some resin with the linoxyn which is used as the coating for the filler particles, it is preferable that the proportion of resinous material contained in the coating for the filler particles be substantially less than the proportion of resinous material in the linoleum cement in which the filler particles are dispersed.

In the preparation of the filler particles comprising linoxyn as a coating, we may use, for example, 22% of lightly gelled oil, 16% of vegetable filler (e. g., wood flour) and 62% of mineral filler (e. g., whiting). This mixture is then oxidized by kneading at elevated temperatures in the presence of air or other gas containing oxygen until the oil attains the highly coagulated state above mentioned. With this formulation, the proportion of oil is sufficient to satisfy the oil absorption of the filler particles plus a small (2%) excess. Such quantity of oil is sufficient to coat the filler particles and is preferred in the practice of this invention. However, the practice in this regard can be widely varied as by reducing the oil content to such point that it is insufficient to cover the surface of all the solid filler material or as by increasing the oil content until the filler particles are characterized primarily by the linoxyn rather than by the solid material forming the nuclei of the particles.

In the manufacture of linoleum composition containing filler particles comprising a linoxyn coating, it is preferable to omit from the linoleum composition vegetable material which does not carry a linoxyn coating. However, a substantial amount of finely-divided vegetable material carrying a linoxyn coating is desirably included in the linoleum composition. Especially when a relatively large amount of mineral filler is used, it is preferable that at least a part thereof carry a linoxyn coating. On the other hand, it is preferable that some of the mineral filler material and particularly that portion which is in the form of a pigment and is relied upon to impart color to the mass be uncoated. In the manufacture of linoleum composition intended for flooring and designed to have high soil resistance and flexibility, the following materials in the following relative proportions have been found to be especially desirable:

|  | Per cent |
|---|---|
| Linoleum cement | 22–30 |
| Linoxyn coated filler (mineral and/or vegetable nuclei) | 25–60 |
| Uncoated mineral filler | 50–10 |

It is preferable that at least about six per cent. of the total composition be in the form of a linoxyn constituting the coating part of all or some of the filler particles which are dispersed in discrete form in the binder. In attaining a high degree of soil resistance, it is preferable also to employ less than ten per cent. of filler material other than mineral filler and other than linoxyn. Moreover, any such material other than mineral filler and other than linoxyn should preferably be coated with a coating comprising linoxyn. It is preferable that the total amount of filler be about 60% to 80% of the linoleum composition.

From another point of view, linoleum composition embodying this invention is characterized by the distribution of the oxidized oil constituent of the linoleum composition. For example, a desirable linoleum composition can be made utilizing in the composition as a whole about 25% to about 35% of oxidized oil and resinous material. Instead of utilizing all of the oxidized oil with the resinous material as a component of the linoleum cement, it is preferable in the practice of this invention that at least about one-quarter thereof be carried by filler particles and be of substantially different character in the particulars afore said from the oxidized oil in the cement, e. g., by containing substantially less of uncoagulated constituents or of resinous materials or both.

Certain specific embodiments of this invention, together with the results of tests comparing the new linoleum with linoleum of ordinary character heretofore made, are shown in the following table:

|  | Regular linoleum composition | Composition including particles comprising coating of linseed oil linoxyn | Composition including particles comprising coating of wood oil linoxyn |
|---|---|---|---|
|  | Percent | Percent | Percent |
| Linoleum cement | 32.0 | 21.9 | 21.9 |
| Wood flour | 31.2 | 6.5 (coated) | 6.5 (coated) |
| Whiting | 14.3 | 24.3 (coated) | 24.3 (coated) |
| Lithopone | 22.5 | 38.6 | 38.6 |
| Linoxyn coating |  | 8.7 (coating) | 8.7 (coating) |
|  | 100.00 | 100.00 | 100.00 |
| Soil resistance |  | High | Very high. |
| Resiliency increased |  | 15% | 20%. |
| Pliability increased |  | 35% | 35%. |
| Elongation under tension increased |  | 43% | 36%. |
| Water absorption decreased |  | 70% | 75%. |
| Expansion in water decreased |  | 60% | 60%. |
| Alkali resistance increased |  | 45% | 60%. |
| Color |  | Same | Whiter. |
| Seasoning |  | 56% increase | 12% decrease. |

In the foregoing table, the different properties of the linoleum compositions were determined as follows:

*Seasoning.*—Period necessary to lower indentation under a 200 pound weight applied on a .282" diameter cylinder for one minute, to 30% of the overall thickness of linoleum.

*Resiliency.*—The percent of the indentation that recovers to its original position within a period of one minute after the 200 lb. weight is removed in the seasoning test.

*Pliability.*—The angle of flexure from the horizontal obtained in a one minute period by putting a 12 inch by 3 inch sample on a ⅜" mandrel, transversely and centrally, and weighting the ends with 100 gram weights.

*Elongation under tension.*—The percentage stretch of a sample of 1 inch square cross section at the breaking point under gradually increasing tension.

*Humidity effect.*—Grams of water absorbed by a sample 6" x 6" x .1" in eight days at 85% humidity from an initial bone dry condition; and the percent dimensional increase in the cross direction under the same conditions.

*Alkali resistance.*—The depth which 2 cc. of 5% water solution of sodium hydroxide will etch in one hour acting on a constant area.

Referring to the foregoing table, it is apparent that the advantages of the new linoleum composition comprising this invention are many. There is not only great improvement in soil resistance but also a great improvement in such desirable properties as resiliency, pliability, elongation under tension (freedom from excessive "shortness"), and resistance to water absorption and swelling due to moisture absorption. Moreover, it is to be noted that substantially less linoleum cement is required than in the usual type of linoleum composition to give equally good working characteristics. Since the amount of linoleum cement is thus reduced, the attainment of the advantages above mentioned by the use of filler particles comprising a coating of linoxyn does not necessitate a substantial increase in the oxidized oil component of the linoleum composition as a whole.

The results set forth in the foregoing table indicate further that filler particles comprising a linoxyn coating prepared from linseed oil have the property of substantially increasing the time within which seasoning of linoleum composition may be accomplished, whereas when the linoxyn coating for the filler particles is prepared from wood oil (or oiticica oil), the seasoning time is not substantially increased but may even be somewhat decreased. When shorter seasoning time is desired, the linoxyn for the coating part of the filler particles should be prepared from wood oil or oiticica or a mixture of these oils with a drying oil or semi-drying oil. As is likewise evidenced by the results set forth in the foregoing table, linoxyn prepared from wood oil or oiticica oil or from a mixture of such oils with other drying or semi-drying oil is likewise preferable because the alkali resistance is increased to a greater extent.

As aforesaid, the coating for the filler particles may consist substantially of linoxyn in the practice of this invention. However, many of the advantages of this invention may be realized even though the coating for the filler particles is not composed wholly of linoxyn. For example, if ten per cent. of rosin is added to an oil such as wood oil and the oil-rosin mixture is oxidized and coagulated so as to occur as a coating comprised in the filler particles, a coating material can be obtained which is highly insoluble in ethyl ether and which contains at least eighty per cent. or more of material insoluble in ethyl ether. Other resinous materials such as alkyd resins or synthetic resins of the oil-soluble phenol-aldehyde type may be incorporated with the linoxyn in the coating for the filler particles. In the preparation of linoleum composition which is intended to have high soil resistance, however, resinous material is preferably omitted from the coating for the filler particles because, as aforesaid, resinous materials especially natural resins and gums are relatively more susceptible than the highly coagulated linoxyn to soiling when incorporated in linoleum composition.

In the preparation of filler particles comprising a coating including linoxyn, other materials than resinous material may be incorporated with the linoxyn, e. g., chlorinated rubber. In such cases, however, i. e., when linoxyn is combined with some material other than linoxyn, the coating material for the filler particles should preferably include linoxyn as the major component.

While particular reference has been made herein to linoleum compositions and the manufacture thereof, this has been done primarily to afford one illustration of the practice of this invention. As hereinabove mentioned, filler particles comprising a coating of the character aforesaid can be interspersed in other binder materials than linoleum cement. For example, such filler particles can be interspersed in a bituminous binder such as pitch. A composition comprising about 22% pitch having a softening point of about 150° F., about 3 per cent. of uncoated mineral filler, and about 75 per cent. of particles comprising a linoxyn coating (the linoxyn being at least 80% insoluble in ethyl ether) is suitable for industrial flooring and is notable for its high degree of pliability, resiliency and soil resistance.

Filler particles comprising a coating containing linoxyn of the character herein mentioned may be also incorporated in soluble cellulose derivatives, such as cellulose ethers (e. g., ethyl cellulose, benzyl cellulose, etc.) and cellulose esters (e. g., cellulose nitrate, cellulose acetate, etc.). For example, a composition containing 40 parts of nitrocellulose and plasticiser, 15 parts of lithopone, and 45 parts of filler particles comprising a linoxyn coating (the linoxyn being at least 80% insoluble in ethyl ether) is notable for its pliability and resiliency.

Chlorinated rubber of 60–70% chlorine content with suitable plasticiser or softener may also be used as a binder for a composition containing filler particles comprising a coating of linoxyn. For example, a composition containing 25 parts chlorinated rubber, 6 parts of blown castor oil, 19 parts tricresyl phosphate, 3 parts ochre, 18 parts cork, and 19 parts of filler particles comprising a linoxyn coating (the linoxyn being at least 80% insoluble in ethyl ether) is pliable and resilient. Moreover, other binder materials may also be employed in which filler particles comprising a coating containing linoxyn may be dispersed. For example, resinous binders may be employed such as the synthetic alkyd resins or resins of the phenol-aldehyde type.

The use of ground seasoned scrap linoleum composition as a filler ingredient of linoleum is known in the art. The binder which has hardened on the particles of vegetable and mineral filler in such scrap is, however, less than 80% insoluble in ethyl ether and usually is only about 60% insoluble. Such ground linoleum scrap, therefore, is deficient in the characteristic insolubility obtained in the linoxyn coating of the specially prepared filler material according to the present invention and in addition contains substantial amounts of resinous material. Using such ground scrap one cannot obtain a linoleum composition having the flexibility, resilience and resistance to soiling which can be obtained in the practice of this invention.

While this invention has been described in connection with certain illustrated embodiments thereof, it is to be understood that this has been done merely for the purpose of affording illustrations thereof, and that the scope of this invention is to be limited only by the language of the following claims.

We claim:

1. A method of making a composition suitable for linoleum or the like which comprises disposing as a coating on finely-divided particles of material selected from vegetable and mineral filler material a drying or semi-drying oil, subjecting the coating to oxidation and coagulation to convert said oil in said coating into linoxyn which is at least 80% insoluble in ethyl ether, said coated particles being of a dry, non-adherent character, making a moldable binder including a resinous material and an oxidized drying oil, distributing said coated particles in discrete form as a filler through the binder to form a moldable composition, and seasoning the composition.

2. A method of making a composition suitable for linoleum or the like which comprises disposing as a coating on finely-divided particles of material selected from mineral and vegetable fillers drying or semi-drying oil comprising an oil selected from the group consisting of Chinawood oil and oiticica oil, subjecting the coating to oxidation and coagulation to convert said oil in said coating into linoxyn which is at least 80% insoluble in ethyl ether, said coated particles being of a dry, non-adherent character, making a moldable binder including a resinous material and an oxidized drying or semi-drying oil containing substantially less than 60% of ethyl ether insoluble material, distributing said coated particles in discrete form in said binder to form a moldable composition, and seasoning the composition.

3. A method according to claim 2 wherein the drying or semi-drying oil used in coating the mineral or vegetable particles is composed predominantly of an oil selected from the group consisting of China-wood oil and oiticica oil and is oxidized and coagulated until linoxyn is formed that is at least 85% insoluble in ethyl ether.

4. A method of making a composition suitable for linoleum or the like which comprises disposing on finely-divided particles of material selected from mineral and vegetable fillers a coating consisting chiefly of drying or semi-drying oil comprising an oil selected from the group consisting of China-wood oil and oiticica oil, subjecting the coating to oxidation and coagulation to convert said oil in said coating into linoxyn which is at least 80% insoluble in ethyl ether, said coated particles being of a dry, non-adherent character, making a moldable binder containing about 15 to 35% of resinous material and about 65 to 85% of an oxidized drying or semi-drying oil containing substantially less than 60% of ethyl ether insoluble material, said binder containing substantially more resinous material than the coating of said particles, distributing said coated particles in discrete form in said binder to form a moldable composition, and seasoning the composition.

DONALD H. SPITZLI.
REEVES L. KENNEDY.